Jan. 17, 1933. P. H. WILSON 1,894,388
JOINTING OF PIPES
Filed Jan. 14, 1930 3 Sheets-Sheet 1
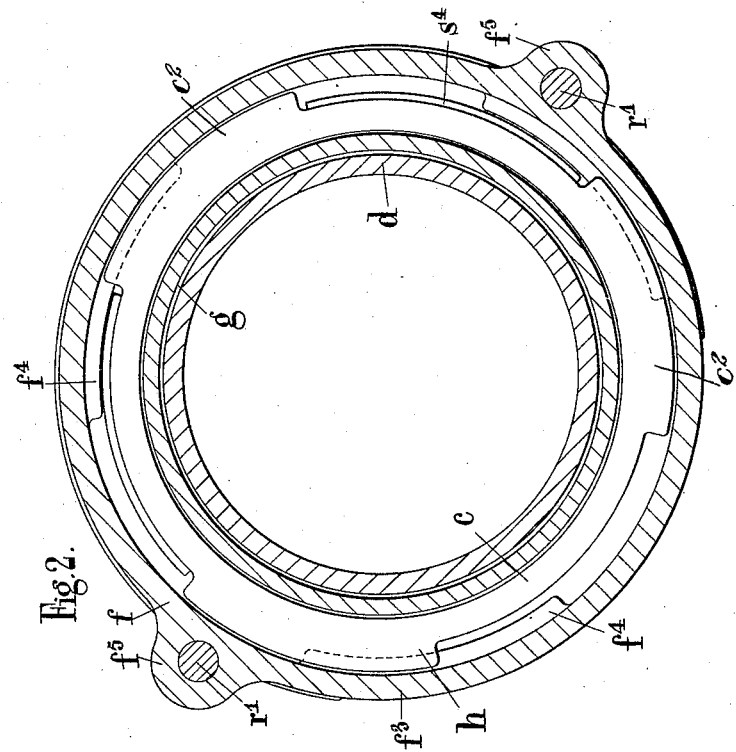
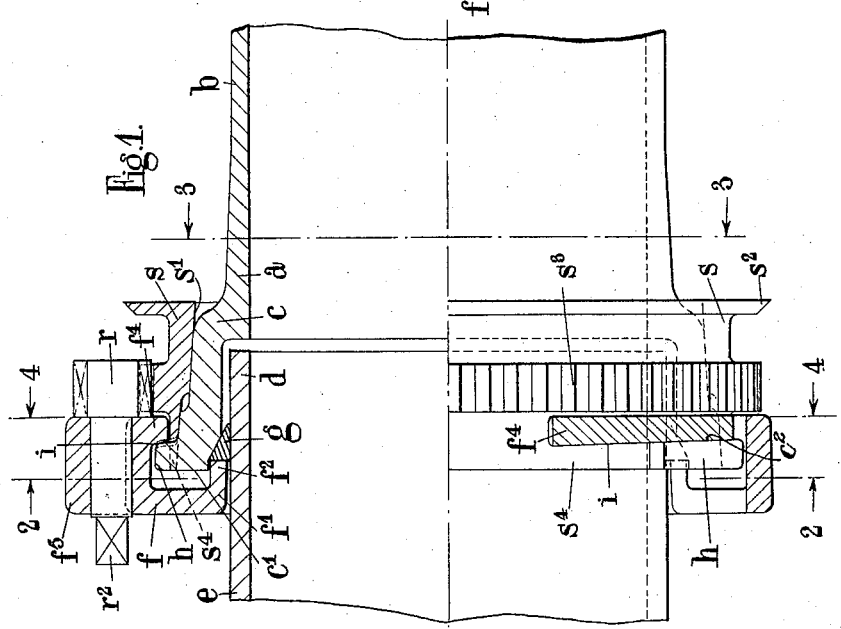
P. H. Wilson
INVENTOR Jan. 17, 1933. P. H. WILSON 1,894,388
JOINTING OF PIPES
Filed Jan. 14, 1930 3 Sheets-Sheet 2

P. H. Wilson
INVENTOR

Jan. 17, 1933.   P. H. WILSON   1,894,388
JOINTING OF PIPES
Filed Jan. 14, 1930   3 Sheets-Sheet 3

P. H. Wilson
INVENTOR

By: Marks & Clerk
Attys.

Patented Jan. 17, 1933

1,894,388

UNITED STATES PATENT OFFICE

PERCY HUTCHINSON WILSON, OF CARLTON, NOTTINGHAM, ENGLAND, ASSIGNOR OF ONE-HALF TO THE STANTON IRONWORKS COMPANY, LIMITED, OF NOTTINGHAM, ENGLAND

JOINTING OF PIPES

Application filed January 14, 1930, Serial No. 420,758, and in Great Britain December 4, 1929.

This invention relates to the jointing of pipes, for instance, in gas, water or other fluid lines, more especially laid below ground and/or in conditions where corrosion may have to be withstood and where flexibility should be provided, for example, to accommodate ground subsidence.

In particular this invention relates to the improved joint of the kind wherein jointing material of a more or less deformable or resilient nature, say rubber, is positioned between overlapping end regions, that is, a spigot and a socket of adjacent pipe lengths and is forced into position and held in sealing engagement by axial pressure, such axial pressure being obtained without caulking or the use or bolts and the like which means necessitate a comparatively great amount of room, for instance a large trench excavation, for tool manipulation and where bolts of wrought iron or steel are used, invite corrosion. An object of this invention is the provision of gear for applying the necessary sealing pressure upon the jointing material where the sealing pressure is obtained through helical surfaces and by the instrumentality of a rigid ring element which rotatably encircles the pipe adjacent the joint and forms a permanent part thereof. A further object is so to devise such gear that it is readily applicable temporarily in turn to the various joints of a pipe line for that purpose.

The nature of the invention will be made clear in the following description and particularly stated in the claims appended.

Reference may now be made to the figures of the accompanying drawings in which:—

Figure 1 is a longitudinal part sectional view of a pipe joint and assembled tightening gear according to the present invention;

Figures 2, 3 and 4 are vertical cross sections taken respectively on the lines 2—2, 3—3 and 4—4 of Figure 1 and viewed in the direction of the adjoining arrows;

Figure 4:
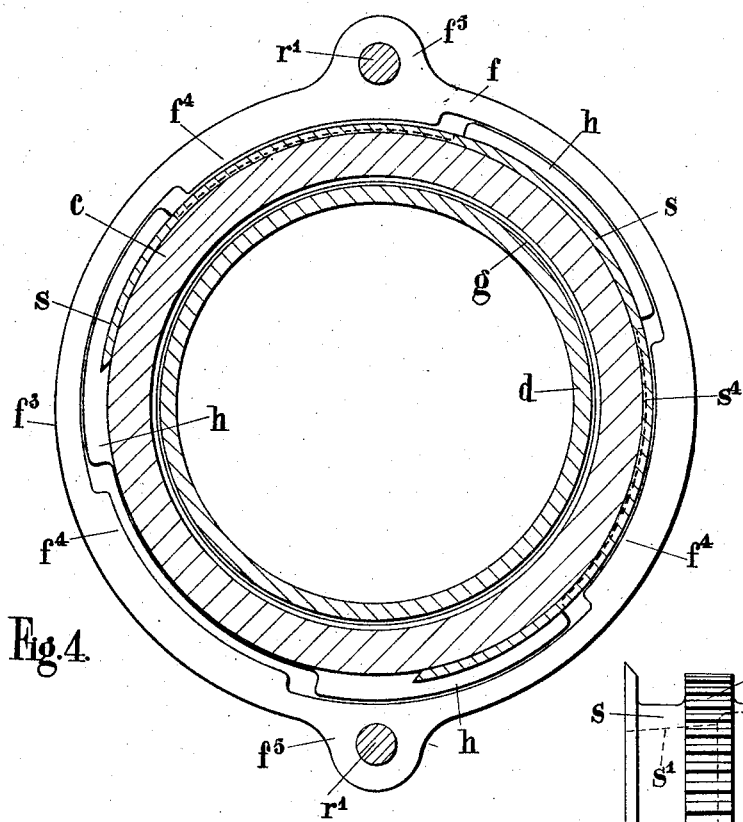

In one convenient form in a pipe joint as shown in the upper half of Figure 1 and in Figure 2 and adapted to be operated upon by the mechanism described later, the end $a$ of one of the pipe sections $b$ is provided in the known manner with a socket $c$ into which the plain end $d$ of the adjacent section of pipe $e$ is loosely fitted. A loosely fitting flange ring $f$ of preferably the same material as the pipes is provided encircling the plain end of the pipe fitting into the socket of the adjoining section. The flange ring has a channel-shaped cross section, the annular opening between the walls of which being arranged to face axially towards the socket. The inner wall $f_1$ of said channel-shaped flange is provided with any suitably shaped edge or end $f_2$ which engages with a ring of jointing material $g$ of rubber or other material retaining the same by axial pressure in a suitable annular space between the interior of the socket $c$ and the outer periphery of the plain section of pipe $d$ fitting thereinto. A plurality of projections $h$, $h$ are provided around the external periphery of the socket being preferably equidistantly spaced and taking wedge-shaped form having a circumferential length dependent upon the number employed. One face of each of the projections is substantially coincident with the end surface $c_1$ of the socket, the other faces $c_2$, $c_2$ being inclined similarly to the plane containing the socket end face $c_1$. These inclined faces in effect form a plurality of helically-advancing surfaces having equal angles of advance.

The outer wall $f_3$ of the channel-shaped flange, or key ring $f$ as it will hereinafter be referred to, extends axially to a greater length than does the inner wall engaging the jointing material, projections $f_4$, $f_4$ of a form similar to those on the socket being provided, as shown, in the outer wall of said key ring and having inclined faces $i$, $i$ for engaging with the faces $c_2$, $c_2$ on the exterior of the socket.

In making the joint, the ring $g$ of jointing material (which may be made of rubber, plain or reinforced with canvas, and, in some cases as shown in the drawings of tapering cross section so as to wedge in a suitable annular tapering recess in the interior of the socket) is pressed for example by hand into the annular space referred to and the key ring $f$ is then moved axially along the plain end of pipe $d$ until it butts against the end $c_1$ of the socket on the adjoining pipe section. On rotating the key ring $f$ until the projections or lugs $f_4, f_4$ thereon are opposite to the intervening spaces between the lugs $h, h$ on the socket, it will then be possible to push the key ring axially over the end of the socket. If the key ring is now rotated so that the inclined faces $c_2, c_2, i, i$ of the lugs $h, h$ and $f_4, f_4$ come into contact with one another and rotation of the key ring be then continued, the latter will be caused to advance axially in the same manner as a nut advances on a screw and the ring and socket will take up a relative position such as is shown in Figure 2. In this case the screw is a multi-threaded one. This action of turning the key ring thus compresses the jointing material forming a tight joint. The lower half of Figure 1 shows more clearly the manner of engagement between a pair of the interengaging faces, the corresponding reference letters indicating the parts above described.

For imparting the necessary rotation to the rigid collar or flange ring $f$ as above, same is provided with two outwardly projecting lugs or eyes $f_5$, these being conveniently cast on diametrically opposite one another and each having a penetrating hole $f_6$ lying parallel to the axis of the ring.

Adapted for ready insertion into and withdrawal from said holes are two spindles $r_1$ each having fixed at one end a small toothed pinion wheel $r$ and at the other end a squared or other portion $r_2$ to accommodate a suitable turning implement.

When the pinions $r$ are in place so that the lugs provide journals for them, and the ring $f$ is pushed into position against the jointing material $g$ in readiness for turning, the pinions $r$ considerably overhang the outside of the socket $c$ some distance radially clear thereof.

The remainder of the turning gear consists of a horseshoe or C-shaped member $s$ of steel or other sufficiently strong material the jaws of which are sufficiently set apart as readily to enable it to be passed or dropped over the pipe $a$ at the plane region $b$ thereof and pushed along over the socket $c$ when the tightening operation is to be performed.

Internally the member $s$ is provided with a slight taper to provide a suitable seating surface $s_1$ complementary to the periphery of the socket and externally is provided with a strengthening end flange $s_2$ and a rack or series of teeth $s_3$ adapted to form the track for the pinions $r, r$ to run over and from which these pinions when turned may impart the necessary rotational force from the socket $c$ to the ring $f$.

To locate the rack member $s$ and prevent rotation thereof relatively to the socket, the former is provided with a thinned extension providing axially extending tongues $s_4$ which are sufficiently thin and so relatively disposed that they may be readily entered between the projections $h, h$ of the socket and be accommodated between same under the projections $f_4, f_4$ on the ring $f$ when the two sets of projections are out of alignment preparatory to the tightening operation.

Figure 3:
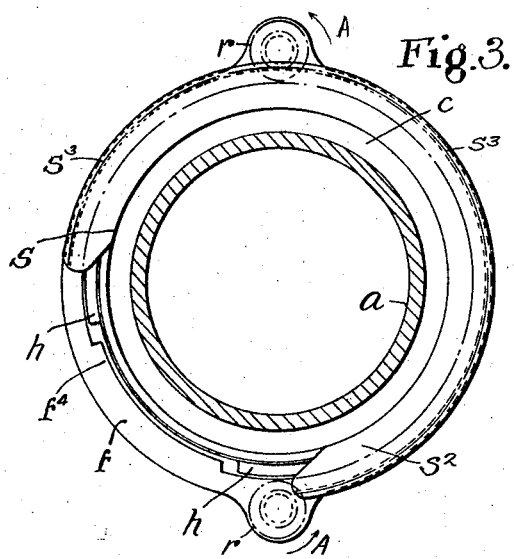
Figure 6:
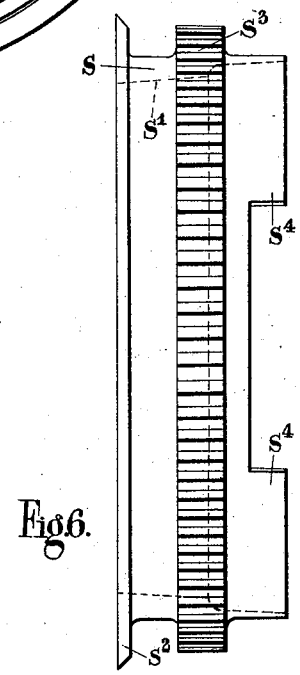
Figure 6 is a plan of the track element of the gear included in the previous figures.
Figure 5:
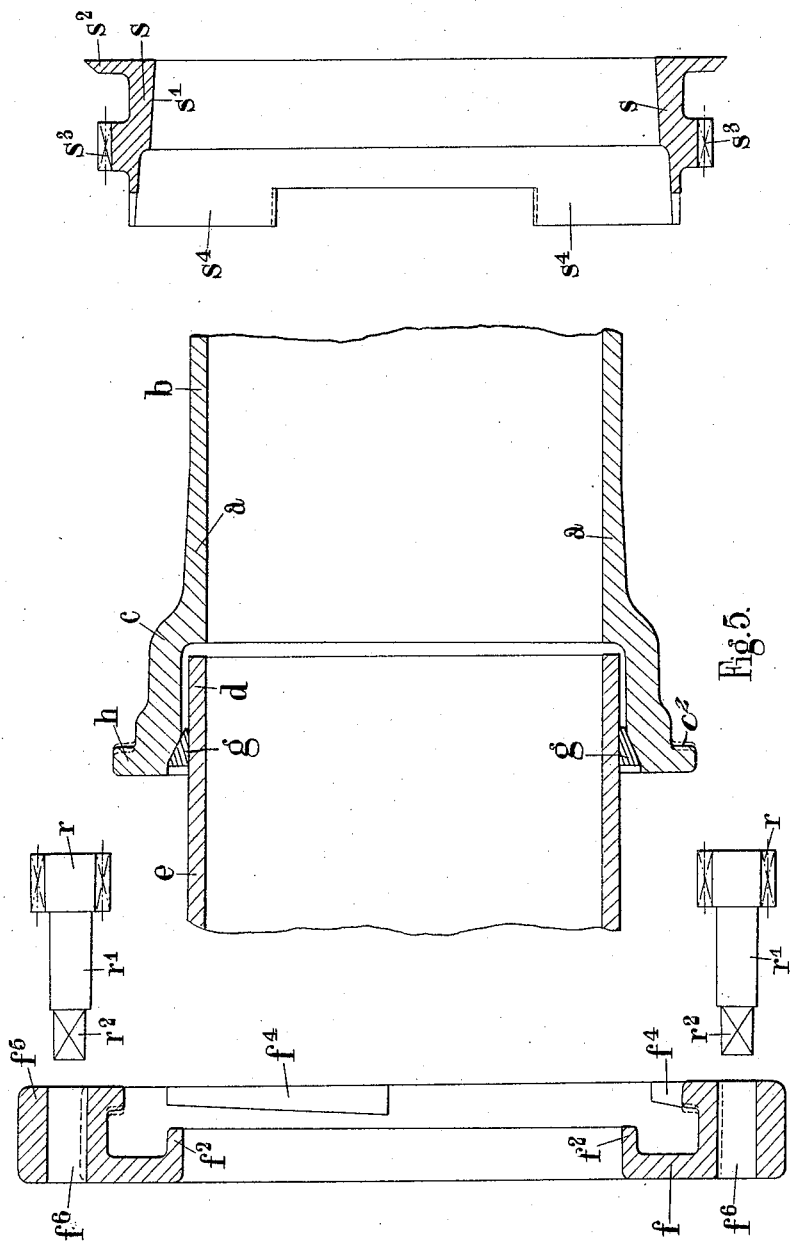
Figure 5 is a view corresponding to Figure 1 showing joint and gear elements in separated positions.

The tongues $s_4$ and the pinion-carrying bosses $f_5$ on the ring $f$ are also so located circumferentially that when the rack element $s$ has been dropped over the socket and pushed axially into position (Figure 1) a tooth or two at one end of the rack $s_3$ is just engaged by the teeth of one of the pinions and the whole appears as shown in Figure 3.

The tightening operation is then performed by imparting rotation to the pinions $r, r$ usually by means of ratchet spanners and in the direction of the arrows A, causing the pinions to roll round the track in anti-clockwise direction (with respect to Figures 3 and 4) drawing with them the ring $f$ through the required distance to bring the projections $h$ and $f_4$ into substantially full alignment and so force home the jointing material $g$ into sealing engagement.

This having been effected the horseshoe piece or track member $s$ and the pinions $r, r$ and spanners are withdrawn respectively from the pipe socket $c$ and the ring $f$ and are ready for use in the same manner for making another joint in the pipe line.

The dismantling of a joint can of course be effected in similar manner to the foregoing by assembling the gear in the position shown in Figure 1 and imparting reverse rotation to the pinions.

In a modification more especially when large or otherwise cumbersome or heavy pipes are being jointed, the gear employed may comprise helical-tooth pinions and rack and by correct choice of helix the axial force applied to the ring during rotation thereof in either direction that is for tightening or for loosening can be considerably increased and/or the stress on the wedge-shape projections $f_4, h$ connecting the ring with the socket, and pressing on the jointing material, considerably relieved during these operations.

As will be readily understood the turning gear described can when the pipe line is laid underground be operated for example from above, the joints being thus readily made with a minimum of trench excavation.

It is to be understood that the foregoing is given by way of example only and modifications may be made in the actual means by which the various operations and effects may be obtained; for instance, the gear used for tightening up other forms of joint operating on the same principle as is illustrated in Figures 1 to 4 of the drawings may require modification as compared with that herein specifically described and illustrated, more especially in the manner of providing against rotation of the track element of the gear with respect to the pipes.

Having now described my invention, what I claim as new and desire to secure by Letters Patent is:—

1. In combination for tightening pipe joints of the kind set forth, an element of horseshoe form adapted for location over partially to embrace said socket, means for preventing rotational displacement of said element when so located, a toothed rack on the periphery of said element disposed to lie adjacent said rigid ring element when the latter is in readiness for rotation, at least one pinion having a spindle, at least one eye externally of said ring element adapted so to locate and carry said spindle that the teeth thereof may mesh with said toothed rack.

2. In the combination set forth in claim 1, said pinion spindle being of sufficient length to extend through said eye and having a region provided to afford grip for a rotating implement.

3. In the combination set forth in claim 1, said first-mentioned means comprising axially extending tongues of said horseshoe element adapted to be fitted between projections in connection with a pipe socket periphery.

4. In the combination set forth in claim 1, helically disposed teeth on said pinions and complementary helical teeth on said horseshoe element, the angle and sense of the teeth helix being such as to provide an axial force component for the purpose described.

5. Mechanism for rotating a ring member forming part of a spigot and socket pipe joint for pressing home and retaining the jointing material through helical surfaces, and which ring member is so formed as so to engage a rotatable member that rotation of the latter would tend to cause rotation of said ring, said mechanism comprising a rotational element, means for rotating same, a second element temporarily applicable to an adjacent peripheral portion of the pipe and having means for preventing rotational displacement thereof on said peripheral portion and also means for so engaging said rotational element as to provide a basis for action and reaction by the rotational element between the ring and the second element to cause rotation of the rotational element to produce relative rotary movement between the ring and the second element.

6. Mechanism according to claim 5, wherein said rotational element is provided with a spindle capable of being bushed to said ring member and said second element comprises an extended element temporarily applicable partially to embrace a peripheral region of the pipe socket in proximity to said first-mentioned peripheral region and affording a track with which said rotational element co-operates and over which it travels on being rotated.

7. Mechanism according to claim 5, wherein said rotational element is provided with a spindle capable of being bushed to said ring member and said second element comprises an extended element temporarily applicable partially to embrace a peripheral region of the pipe socket in proximity to said first-mentioned peripheral region and affording a track with which said rotational element co-operates and over which it travels on being rotated, said fixing means comprising laterally extending means carried by said extended element and adapted to interlock with projections on the pipe socket.

In testimony whereof I have signed my name to this specification.

PERCY HUTCHINSON WILSON.